Sept. 29, 1970            G. CECCHINI            3,531,712

CURRENT STORAGE D-C VOLTAGE CONVERTER

Original Filed July 28, 1967            4 Sheets–Sheet 1

INVENTOR.
GIUSEPPE CECCHINI

Sept. 29, 1970   G. CECCHINI   3,531,712
CURRENT STORAGE D-C VOLTAGE CONVERTER
Original Filed July 28, 1967   4 Sheets-Sheet 2

INVENTOR.
GIUSEPPE CECCHINI
BY George V. Eltgroth and
Joseph B. Forman

INVENTOR.
GIUSEPPE CECCHINI

INVENTOR.
GIUSEPPE CECCHINI

United States Patent Office 3,531,712
Patented Sept. 29, 1970

3,531,712
CURRENT STORAGE D-C VOLTAGE CONVERTER
Giuseppe Cecchini, Milan, Italy, assignor to Olivetti-General Electric S.p.A., Caluso, Torino, Italy, a corporation of Italy
Continuation of application Ser. No. 656,793, July 28, 1967. This application June 6, 1969, Ser. No. 833,884
Claims priority, application Italy, July 30, 1966, 17,737/66, Patent 774,432
Int. Cl. G05f 1/56
U.S. Cl. 323—4                                   12 Claims

ABSTRACT OF THE DISCLOSURE

A direct current voltage converter wherein voltage stabilization is effected by storage of current in an inductive device, said current being supplied to a load subject to the sensing of voltage and current requirements of the load and through the operation of appropriate switches to make such stored current available at the appropriate time.

---

This application is a continuation of U.S. patent application 656,793, filed July 28, 1967.

The present invention relates to direct-current voltage converters, that is, to devices which operate from an unregulated source of direct current to produce a direct-current output at a different voltage wherein the output voltage is, in general, stabilized and regulated between definite limits.

In prior art devices of this kind, the problem of converting the voltage of a direct current source from a given value to a different one, is generally solved by transforming the direct-current input to the device into a pulsing or alternating current by means of a vibrator or an inverter, or a similar device, and by feeding this pulsing or alternating current into the primary winding of a transformer, thus obtaining as an output from the secondary winding, an alternating current having a predetermined voltage. This current is rectified and smoothed, to produce a direct current output at the required voltage. A stabilizing arrangement may be introduced into the converter, by means of a feedback device responsive to the difference between the effective and the required output voltage.

In such apparatus, the maximum voltage value of the output current is determined by the turn ratio between primary and secondary winding of the transformer, and lower voltage values may be obtained by energy dissipating means, therefore the stabilized output voltage must be predetermined by the designer and may change only between very restricted limits.

Moreover, the use of a transformer is a cause of lower efficiency and of noise, due to the hysteresis loss in the iron core, which is subject to an alternating flux.

In a different type of regulated converter, which does not use transformers, the output voltage is necessarily lower or, at most, equal to the voltage of the feeding direct current source. There is a substantial limitation to the values of the output voltage, and remarkable power dissipation may take place.

The present invention obviates the above referred to inconvenience, its object being to provide, without the use of transformers, a direct current voltage converter wherein the output voltage is wholly independent, within large limits, of the voltage of the input D-C source. In particular, the output voltage may be several times higher than the input voltage.

The converter, according to the invention, comprises an inductor, through which a substantially constant current is caused to flow by means of a control device which, in response to data delivered by convenient measuring arrangements, controls a multiplicity of switches, thereby causing, in differently interlaced time intervals, the selective connection of the inductor either to the stabilized current source alone; to the stabilized current source and the load circuit; to the load circuit alone; or the short-circuiting of the said inductor, which thereby acts as a current-storage device.

When the inductor is connected to the load, it acts as an almost ideal current generator, therefore feeding the load circuit at a voltage, which depends only on the output circuit characteristics, and is independent of the direct-current input source voltage.

Therefore, the converter, according to the invention, provides the conversion of the voltage of an unstabilized D-C source to the value required by the load, without the use of transformers, and without ever inverting or interrupting the current in the inductor.

In addition, the device, according to the invention, may be used to generate a multiplicity of voltages of different values applied to different loads, through the use of a single non-stabilized power source and a single inductor.

These and other features and advantages of the invention will appear more clearly from the detailed description of an illustrative embodiment thereof, taken in conjunction with the accompanying drawings, in which.

Figure 1:
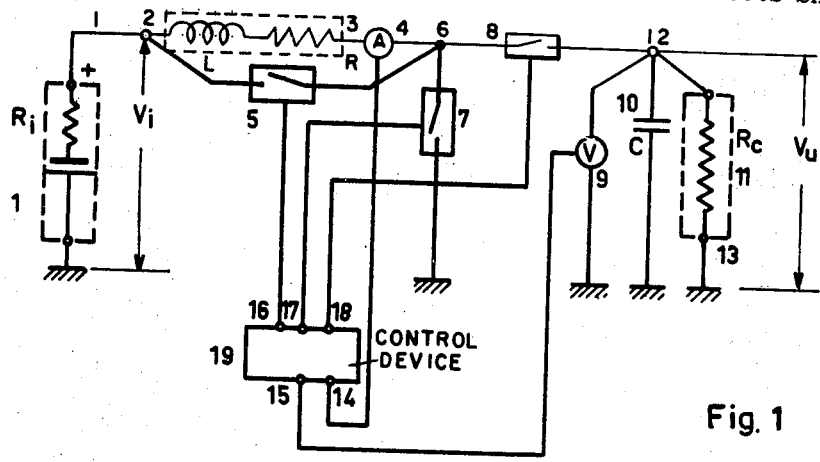
FIG. 1 represents a circuit diagram of the device.

In FIG. 1 the circuit diagram of the device is shown in its basic form. The direct-current non-stabilized power source 1, having the internal resistance $R_i$, delivers to input terminal 2, a direct voltage of value $V_i$ with respect to ground.

Inductor 3 is connected to input terminal 2 and a current measuring device 4, having a very small resistance, is serially connected to inductor 3. This current measuring device 4, delivers an information signal related to the current value, to input 14 of the control device 19. The inductance value L of inductor 3 is conveniently large, and its resistance value R, including the resistance value of the current measuring device 4, is small. A switch 5, controlled by an output 16 of the control device, is connected between input terminal 2 and output terminal 6. When said switch is closed, inductor 3 is short-circuited.

A second switch 7, controlled by an output 17 of the control device 19 may connect the output 6 to earth. In this condition a circuit comprising the power source 1, inductor 3, current measuring device 4, and switch 7, is completed.

A third switch 8 is controlled by output 18 of the control device 19. When switch 8 is closed, output terminal 6 is connected to load terminal 12, to which following circuits are parallel connected: the load 11, which is assumed to be substantially resistive having a resistance $R_o$, a capacitor 10 of capacity C; a high impedance voltage measuring device 9, which is capable of measuring the output voltage $V_u$ and which sends a corresponding information signal to input 15 of control device 19.

It is assumed that the switches 5, 7 and 8 are operated instantaneously in response to the device 19 and that the switches, when closed, show practically no resistance, and, when open, show no conductance, within the range of current and voltage values to which they are subjected.

A possible operating sequence for the device of FIG. 1 is described, hereinafter, with reference to FIGS. 2a and 2b, which show the variation of the current I in the inductor and that of voltage $V_u$ across the load.

It is assumed that, at the initial time $t_0$, switch 7 is closed, switches 5 and 8 being open. A circuit is completed, from the positive terminal 2 of the source 1, having the internal resistance $R_i$, through inductor 3, and current measuring device 4, having a combined resistance R and an inductance L, and the closed switch 7, to ground. The current I in such a circuit increases according to an exponential law having a high time constant $L/R+R_i$. If the time interval considered is sufficiently small with respect to said time constant, the current increase with time may be considered to be linear, as represented by line OA in FIG. 2a. When the current reaches a predetermined upper limit value $I_A$ at time $t_1$, the control device 19 closes switch 5 and opens switch 7. Inductor 3 is therefore short-circuited by the switch 5. The current in the inductor will decrease according to a very large time constant $L/R$, as represented by line AB.

When the decreasing current has reached a lower limit value $I_B$, at time $t_2$ switch 7 closes and switch 5 opens, thereby restoring the conditions existing in the time interval $t_0$–$t_1$. The current will then increase until it reaches the upper limit value $I_A$, at time $t_3$, switch 5 closes and switch 7 opens. Therefore, through the operation of control device 19, a unidirectional current, whose value is confined between limits $I_A$ and $I_B$, is maintained in inductor 3. As the difference between the exterior limits may be made very small, a direct current having a substantially constant value $I_m=(I_A+I_B)/2$ flows through the inductor.

The circuit components are so designed, that the value $I_m$ is substantially higher than the value of the current drawn by the load. The inductor L operates as a current storage device, periodically reloaded by source 1. Energy dissipation is negligible as resistance $R_i$ and R are very small.

We now consider the external load 11 fed from terminal 12 to which the capacitor 10 is also connected. The capacitor 10 is charged at a variable voltage $V_u$, which must be maintained between two predetermined limits $V_A$ and $V_B$.

It is assumed that said limits are both higher than the input voltage $V_i$ and differ only by a small value, such that a voltage, $V_m=(V_A+V_B)/2$, approximately constant, is present at the output terminal 12.

Figure 2:
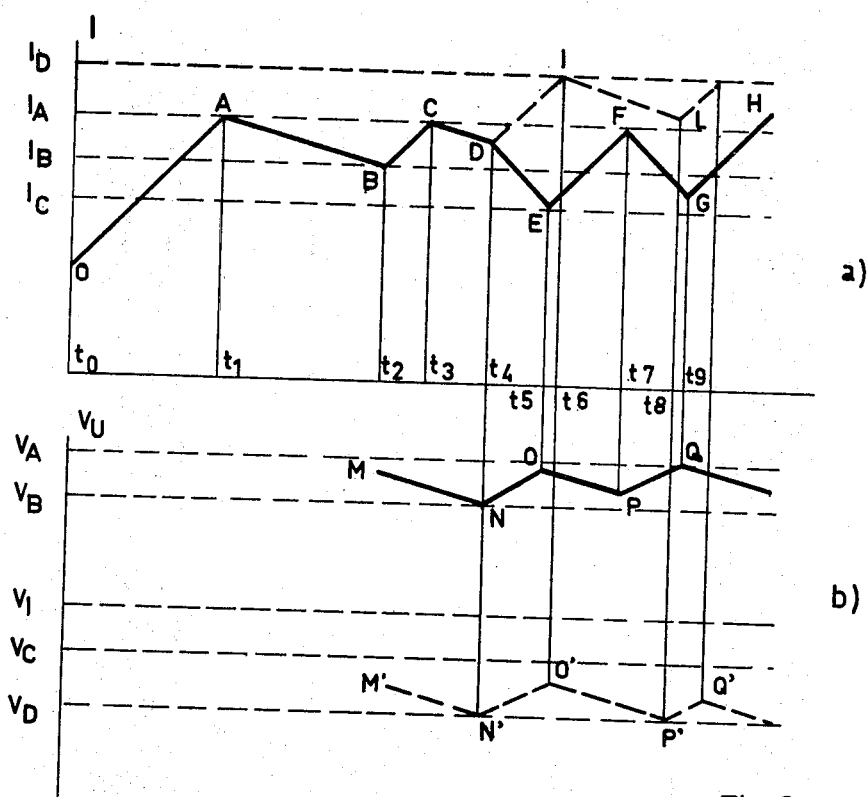
FIG. 2a and FIG. 2b are graphs representing the currents and voltages in different operating conditions.

The current drawn by the load 11 discharges condenser 10, in such a way, that the output voltage $V_u$ decreases according to a law which may be represented by line MN in FIG. 2b. The instantaneous values of said voltage are measured by voltage measuring device 9 and the corresponding information signals are sent to input 15 of the control device 19. When the voltage $V_u$ reaches the lower limit $V_B$ at time $t_4$, the control device closes switch 8 and opens switch 7 or switch 5, according to which one was previously closed (in case under consideration, switch 5).

Thus a circuit is completed, from output terminal 2 of the power source 1, through inductor 3, current measuring device 4, switch 8 and load 11, to the ground or earth.

In that part of the circuit of FIG. 1 which is between terminal 2 and terminal 12, a positive voltage difference $\Delta V=V_i-V_u$ is present, that is directed in the same sense of the current under conditions of $V_i>V_u$, negative in the opposite case. In this part of circuit the inductive E.M.F. $LdI/dt$ is active. At time $t_4$, when switch 8 is closed, disregarding the resistance R, it is $$LdI/dt=\Delta V$$

The derivative $dI/dt$ of the current has the same sign as $\Delta V$: therefore the current will increase or decrease according to whether the output voltage is lower or higher than the input voltage. In any case, at least for a finite time interval, the current will continue to flow in the same direction as before, therefore charging capacitor 10 and causing voltage $V_u$ to increase.

If, as assumed, the output voltage $V_u$ is higher than $V_i$, $\Delta V$ is negative and the current will decrease as indicated by the solid line DE in FIG. 2a. Correspondingly, the output voltage $V_u$ will increase as shown by the solid line NO.

It may happen, as shown by the figure, that at time $t_5$, before the voltage $V_u$ reaches the upper limit $V_A$, the current reaches a second lower limit $I_C$, below which it is not advisable to let it decrease. In such a case the control device 19 closes switch 7 and opens switch 8, thereby restoring the conditions for increasing the inductor current, and the current increases as shown by EF till time $t_7$, at which time it reaches the upper limit $I_A$, while the voltage decreases along OP. At time $t_7$ switch 8 closes and switch 7 opens, the current charges the condenser and causes its voltage to increase till it reaches the upper limit $V_A$ (line PQ). In this condition switch 8 opens and either switch 7 or switch 5 close, depending on whether the current value in the inductor is lower or higher than value $I_B$.

In the event the output value $V_u$ is lower than input value $V_i$, the voltage difference V is positive, and, therefore, $dI/dt$ is positive.

As switch 8 closes the current increases, as shown by the dashed line DI of FIG. 2a.

The dashed line in the lower part of FIG. 2b shows the output voltage variation in the event the voltage must be confined between limits $V_C$ and $V_D$; both lower than input voltage $V_1$.

If at time $t_4$, the output voltage decreasing along line M′M′, reaches the lower limit $V_D$, the control device closes switch 8 and opens switch 7 or 5. From this time on, as heretofore shown, the inductor current will increase along the dashed line DI, and correspondingly voltage $V_u$ will increase as shown by line N′O′.

It may happen that, before the voltage $V_u$ has reached the upper limit $V_c$, the inductor current reaches a second upper limit $I_D$ over which it is not advisable to permit it to increase. In this event the control device closes switch 5 and opens switch 8. The current will decrease along line IL till voltage $V_u$ has reached the lower limit $V_D$ at time $t_8$ (line O′P′). The process is repeated, and the output voltage is always confined between limits $V_C$ and $V_D$.

By a proper choice of the characteristics of inductor 3 and capacitor 10, considering the current drawn by the load 11, and the current which may be delivered by the source 1, it is possible to provide that the energy, delivered by the source to inductor 3 during the intervals when switch 7 is closed, is at least sufficient to compensate for the energy delivered by inductor 3 to condenser 10 during the intervals when switch 8 is closed.

The operation of the device according to the invention may be more concisely described considering that, when switch 8 is closed and the other switches are open, the inductor acts, at least for a finite interval of time, as an ideal current generator, and is therefore capable of delivering to the load a determined current, whatever may be the feeding voltage to the load.

It is clear that the operating pattern described may be changed in many ways, either by connection of the switches and measuring devices in a different configuration or with respect to the succession of opening and closing operations of the switches and the operative logic of the control device.

In particular, it may be convenient to introduce a clocking device, so that the closing and opening operations of the different switches do not depend exclusively upon the reaching of predetermined limit values for the voltage and the current, but rather that they, at least partially follow a predetermined temporal succession controlled by such clocking device.

A preferred embodiment of the invention wherein the switching is accomplished by semiconductor elements and the succession of the closing and opening operations is conjointly determined by a clocking device and a logical network, is hereinafter described.

Figure 3:
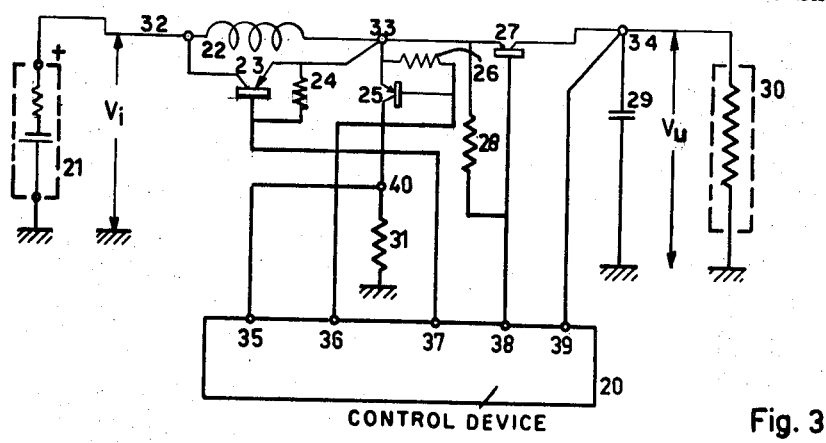
FIG. 3 represents a simplified circuit diagram of a particular embodiment of the invention.

The clocking device and the logical network are included in the control device indicated by the numeral 20 in FIG. 3. It will not be herein described because the different means of achieving the same are known to anyone skilled in the technique of electronics, and may be easily deducted by the sequence of command signals that the said control device is called upon to deliver to the switching elements of the circuit, dependent upon the input data furnished by the measuring devices.

In this embodiment of the invention the switches are conveniently constituted of solid state switching elements, such as diodes, silicon controlled diodes, transistors and the like.

FIG. 3 represents the circuit diagram of a circuit using transistors as switches, which circuit is particularly adapted for use with output voltage which is generally higher than the input voltage.

This converter circuit includes a non-stabilizer current source 21 having one terminal connected to ground and the other terminal connected to the inductor 22, a PNP-type transistor 23, whose emitter and collector are respectively connected to terminals 33 and 32 of the inductor, and whose base is connected to the emitter through resistor 24 and is also connected to terminal 37 of the control device 20. A command circuit, not shown, is part of the control device and connected to said terminal 37 may turn said transistor on or off, fulfilling the function of switch 5 of FIG. 1.

Terminal 33 is also connected to the emitter of transistor 25, whose collector is connected to ground though low value resistor 31. Point 40, common to resistor 31 and collector of transistor 25, is connected to terminal 35 of the control device 20. The base of transistor 25, connected to the collector through resistor 26, is also connected to terminal 36 of the control device.

A command circuit, not shown, is part of the control device 20 and connected to the terminal 36, may turn said transistor 25 on and off, fulfilling the function of switch 7 of FIG. 1. When this transistor is conducting, it completes the circuit consisting of power supply 21, inductor 22, transistor 25, resistor 31 and ground.

In the foregoing circuit a current flows, and point 40 is brought to a voltage, relative to ground, proportional to said current. The resistor 31 therefore fulfills the function of the current measuring device 4 of FIG. 1, differing that it is series connected to the inductor only when the terminal 33 is connected to the ground. This disposition has the advantage that, when the inductor is short-circuited by transistor 23, the resistance 31 is not included therein.

Terminal 33 is moreover connected to the emitter of the transistor 27, whose collector is connected to output terminal 34. The base of said transistor 27 is connected to its emitter through resistor 28, and furthermore to terminal 38 of the control device 20. A command circiut, not shown, contained in said control circuit and connected to said terminal 38 may turn the transistor 27 on and off.

The transistor 27 therefore fulfills the function of switch 8 of FIG. 1. The load 30 and the capacitor 29 are connected to terminal 34, which is also connected to terminal 39, as input to the voltage measuring device included in control device 20.

Figure 4:
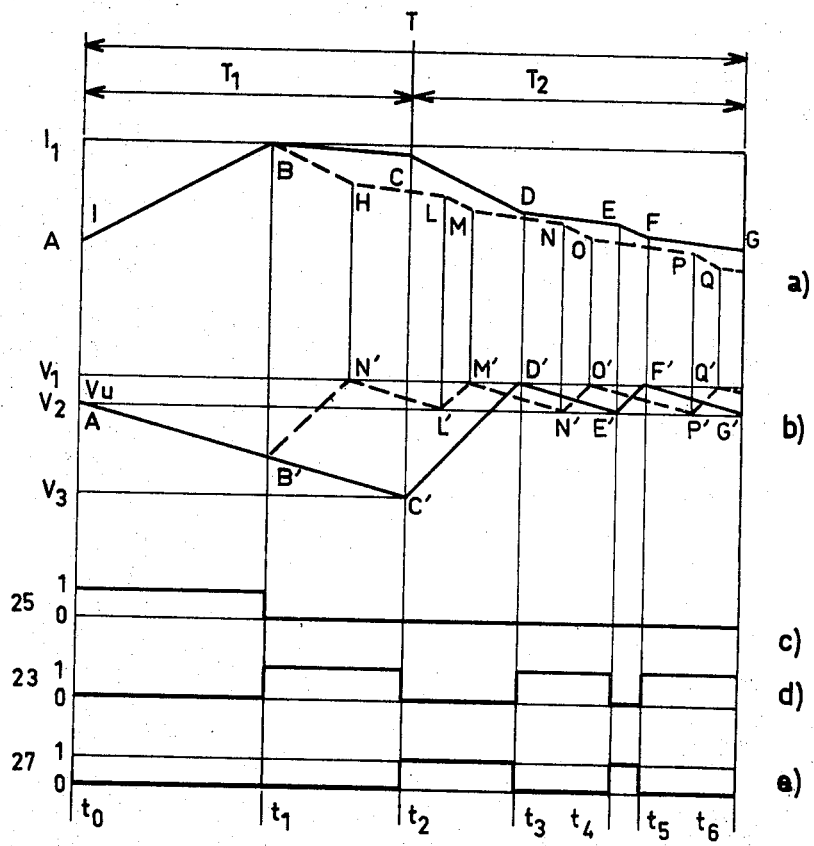
FIG. 4a and FIG. 4b represent the currents and voltages in said particular embodiment.
FIGS. 4c, 4d, 4e are the diagrams representing the ON and OFF conditions of the switches in the same embodiment.

The operation of the circuit, as controlled by the different command signals emitted by the control circuit 20 in dependence of input data, is hereinafter described, with reference to the diagrams of FIG. 4. The current I flowing through the inductor is represented by diagram $a$. Diagram $b$ represents the voltage $V_u$. The diagrams $c$, $d$ and $e$ represent the ON and OFF conditions of the transistors 25, 23 and 27, the line drawn at level 1 means that during the corresponding time interval the transistor is ON, and the line at level 0 means the transistor is OFF.

The pattern of operation comprises repetitive operating cycles having a constant period T. Each period is divided into two sub-periods $T_1$ and $T_2$. The current I flowing into the inductor is controlled in one of said sub-periods, for instance $T_1$ and the output voltage $V_u$ is controlled in the sub-period $T_2$.

At time $t_0$ sub-period $T_1$ is initiated. The control device applies a command to transistor 25 turning it ON and completing the circuit comprising the non-stabilized power supply 21, inductor 22 and resistor 31. It is assumed that at time $t_0$ the value of the current flowing in the inductor is lower than a prefixed value $I_1$. As a consequence the voltage at terminal 35 is also lower than a given value, and in this condition the control unit maintains the transistor 25 in an ON state. The current in the said circuit increases according to the time constant of the circuit, and it may be assumed to increase linearly following the line AB, as the sub-period duration is assumed to be small with respect to said time constant. At instant $t_1$, the current reaches the limit value $I_1$ and as a consequence, the control device turns the transistor 23 ON and the transistor 25 OFF. Now the current flows in the circuit including only inductor 22 and transistor 23, having a very high time constant. The value of the current will decrease according to the line BC at a very slow rate until the end of the of the sub-period $T_1$.

If at time $t_0$ current I is higher than the limit value $I_1$, transistor 25 is immediately turned OFF and the transistor 25 is immediately turned OFF and the transistor 23 is immediately turned ON.

From time $t_2$ on, that is, during the sub-period $T_2$ the circuit operation is controlled only by the value of the output voltage $V_u$ at terminal 39.

During the sub-period $T_1$ the capacitor 29 was discharged through the load 30, and therefore it may be assumed that at time $t_2$ the output voltage $V_u$ is lower than a predetermined lower limit $V_2$. In this condition the control device 20 turns the transistor 27 ON and the transistor 23 OFF completing the circuit comprising the power source 21, inductor 22, transistor 27 and the load 30. The current, as heretofore shown, also continues to flow from the power supply 21 to the load 30 in the event the output voltage $V_u$ is higher than the input voltage $V_1$. Therefore the voltage $V_u$ increases along the line C'D', while the current decreases along the line CD. When the voltage $V_u$ reaches the upper limit $V_1$, the control device turns transistor 23 ON and transistor 27 OFF. The current flows in the circuit comprising only inductor 22 and transistor 23 and varies according the line DE, while the voltage decreases following the line D'E'.

At time $t_4$ the voltage $V_u$ reaches a predetermined lower limit $V_2$, the control device turns transistor 27 ON and transistor 23 OFF, the voltage increases along the line E'F', while the current decreases along the line EF. During all the remaining interval of sub-period $T_2$ the voltage $V_u$ is maintained between limits $V_1$ and $V_2$, and the current decreases following the line CDEFG. At time $T_6$ the sub-period $T_2$ is terminated, and sub-period $T_1$ again starts, and the current first increases, and afterward decreases, while the voltage steadily decreases.

The voltage regulation therefore is not confined between limits $V_1$ and $V_2$, but between the larger limits $V_1$ and $V_3$, wherein $V_3$ is the voltage reached at the end of sub-period $T_1$. By a proper proportioning of capacitor 29 the minimum value $V_3$ may be maintained sufficiently close to $V_1$.

Several modifications to such operating pattern may be introduced for example, the duration of sub-periods $T_1$ and $T_2$ may change reciprocally. This happens for instance, if time $t_1$, when the transistor 23 is turned OFF, is taken as the initial time of the second sub-period, in place of the fixed time $t_2$. The variation of the voltage and the current is then represented by the dashed lines respectively BHLMNOPQ and B'H'L'M'N'O'P'Q' of FIG. 4. To obtain this, it is sufficient that the joint control of transistors 23 and 27 be controlled by the voltage $V_u$ immediately after the transistor 25 is turned off and transistor 23 is turned on.

The current and voltage measuring devices, which are part of the control device 20 and have input terminals 35 and 39, may be provided with adjusting inputs (not shown), capable of changing the limiting values $I_1$, $V_1$ and $V_2$ by means known to anyone skilled in the art. Therefore high operating flexibility may be obtained. In particular, if the upper and lower limits $V_1$ and $V_2$ of voltage $V_u$ are made to change in the same sense and by the same value, either by manual control or by programmed variation, a device is obtained, which is able to deliver direct-current at a voltage continuously variable between large limits, either at the will of the operator, or according to a predetermined program.

Figure 5:
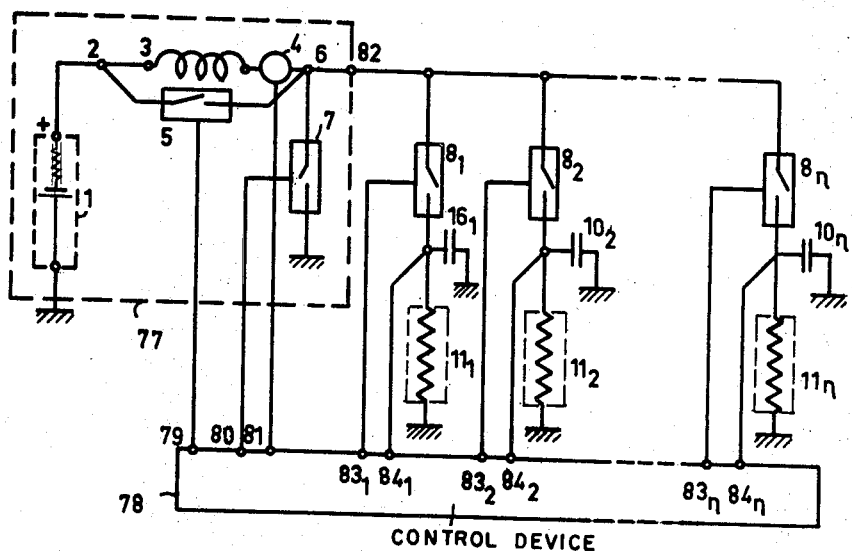
FIG. 5 represents a circuit diagram having a multiplicity of loads.

In the frequent case, wherein the converter is called upon to deliver several different direct current voltages regulated at different levels, and fed by a single direct-current supply, the circuit of FIG. 5 may be applied. A common feeding device 77 comprises the non-regulated power supply 1, the inductor 3, the current measuring device 4 and the controlled switches 5 and 7 in a circuit corresponding to the circuit of FIG. 1. The current measuring device may be connected between switch 7 and ground, according to the circuit of FIG. 3. The conductors for the control of switches 5 and 6 and the output of the current measuring device 4 are connected respectively to terminals 79, 80, 81 of the control device 78.

The output terminal of the common feeding device is connected to the inputs of $n$ switches $8_1$, $8_2$ . . . $8_n$, which may feed $n$ loads $11_1$, $11_2$ . . . $11_n$, connected in parallel with a respective one of $n$ capacitors $10_1$, $10_2$ . . . $10_n$. The control wires of the $n$ switches $8_1$ . . . $8_n$ are connected to corresponding terminals $83_1$ . . . $83_n$ of the control device 18, and the voltages present at the load inputs are similarly connected to terminals $84_1$ . . . $84_n$ of said control device. This control device provides means, with reference to the different required values of the several output voltages, for selectively and sequentially feeding the different loads, by closing the corresponding switches 8, and in addition it provides for periodically closing switch 5 or switch 7 in conformity with the regulation requirements for the current flowing in the inductor 3.

Figure 6:
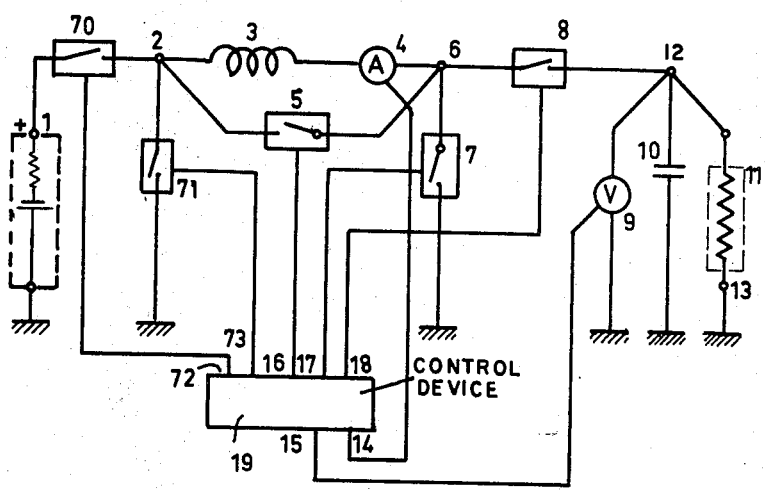
FIG. 6 is a circuit diagram of another embodiment of the invention.

The circuit diagram of FIG. 1 and the corresponding circuit diagram of FIG. 3 are particularly useful when the input D-C voltage is converted to a higher value, that is, if output voltage $V_u$ is higher usually than the input voltage $V_i$. If this condition is not fulfilled, that is, if the output voltage is generally lower than the input voltage, for a long time interval, it is possible that the current I flowing in the inductor will be increased over the limit $I_D$ (FIG. 2a) compatible with the proportioning of the components used. If the device is to be operated under such conditions, it may be convenient to add, in the circuit diagram of FIG. 1, two switches 70 and 71, as indicated in FIG. 6. Switch 70 is series connected between positive terminal of the power supply 1 and the input terminal 2 of inductor 3, whereas switch 71 is connected between said terminal and the ground. Both switches are controlled by the control device 19 by means of wires connected respectively to terminals 72 and 73 of said device. If, during the time when the switch 8 is closed, the current in the inductor 3 increases over a predetermined limit, switch 70 is closed and switch 71 is opened.

The following circuit is then completed, ground, switch 71, inductor 3, current measuring device 4, switch 8, load 11 and ground. In this circuit the E.M.F. due to the self-inductance of the inductor 3 is opposed by the entire voltage $V_u$. Therefore, the current will flow, charging capacitor 10 and increasing the output voltage $V_u$ as required by the control device, but the value of said current will rapidly decrease so that it returns soon within admissible limits. When the current is decreased under the lower limit $I_B$ (FIG. 2a) switch 71 is opened and switch 70 is closed, restoring the condition shown by the circuit of FIG. 1.

In the event the voltage conversion always takes place from a lower to a higher value, the device of FIG. 1 may be simplified, by substituting a diode for switch 7.

Figure 7:
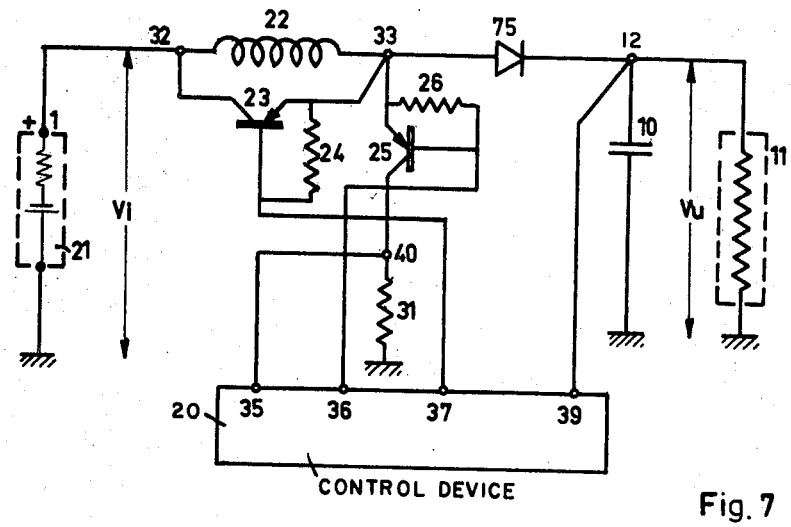
FIG. 7 and FIG. 8 are circuit diagrams of two simplified forms of the invention.

In the embodiment of the invention corresponding to FIG. 3 this may be carried on by substituting a diode 75 for transistor 27 as shown in FIG. 7. As a consequence, the control device will not require the output terminal 38.

The operation is as follows:

During the first sub-period $T_1$ the operation is the same as described with reference to FIG. 5. The output voltage $V_u$ is constantly higher than the voltage of terminal 33 because, when the transistor 25 is ON, its voltage is near the ground voltage; and when the transistor 23 is OFF, its voltage is slightly lower than the voltage $V_i$. Diode 75 therefore is always backward biased and does not conduct. At time $t_2$, if the voltage $V_u$ is lower than the lower limit $V_2$, a blocking signal is sent to transistor 25 which is turned OFF. As the circuit including power supply 21, inductor 22, transistor 25, resistor 31, through which the current I was flowing, is interrupted, the self-inductance of inductor 22 causes the voltage of terminal 33 to increase almost instantaneously, till it becomes higher than the output voltage $V_u$. In this condition diode 75 conducts and the current I is reestablished through the circuit including power supply 21, inductor 22, diode 75, load. The capacitor 10 is charged and voltage $V_u$ increases correspondingly the voltage at terminal 33 increases and remains higher than voltage $V_u$ by a quantity corresponding to the voltage drop across diode 75.

When the voltage $V_u$ becomes higher than the predetermined value $V_1$, a conduction signal is sent to transistor 23 which turns ON.

Inductor 22 is short-circuited by conducting transistor 23, and the terminal 33 acquires substantially the voltage $V_i$. Diode 75 is backward biased and does not conduct.

Therefore, by controlling both transistors 23 and 25 the control of the conducting or non-conducting state of diode 75 is obtained, and said diode fulfills the functions of switch 8 of FIG. 1.

Figure 8:
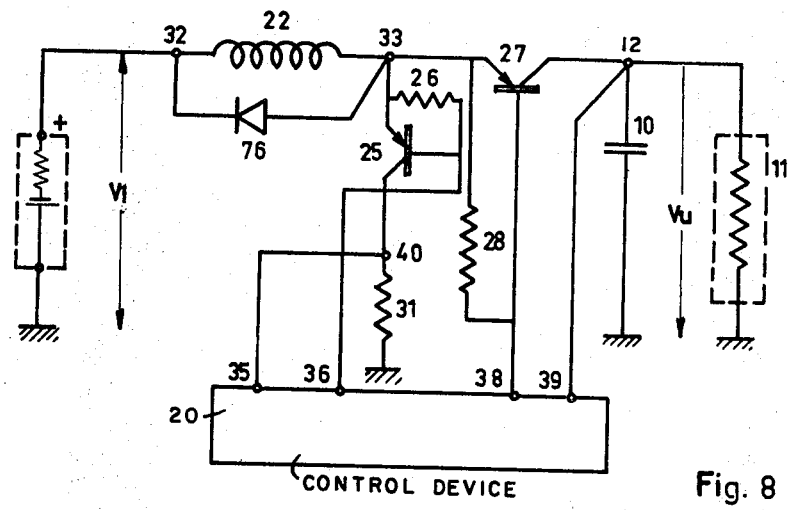

If the voltage conversion always takes place from a higher to a lower value, the circuit shown in FIG. 8 which is obtained from the one of FIG. 3 by substituting diode 76 for transistor 23 may be utilized. Correspondingly, the control device will lack the output 37. The operation is as follows:

During the time intervals that either transistor 25 or transistor 27 shown in the circuit of FIG. 8 are ON, the current flows in the corresponding circuits and the voltage of terminals 33 is slightly higher than the ground potential or the output voltage $V_u$. In both cases the diode 76 is backward biased and does not conduct.

During the first sub-period, transistor 27 is permanently OFF and, at $t_2$, also transistor 25 is turned OFF, the current is interrupted, and the voltage at terminal 33 increases almost instantaneously till it becomes higher than input voltage $V_i$. Diode 76 is properly biased to conduct and short-circuits inductor 22.

The same happens during the second sub-period when, transistor 25 is OFF, and transistor 27 turns OFF. Therefore, by the control of transistors 23 and 25, the control of the conducting and non-state of diode 76 is obtained and diode 75 fulfills the function of switch 5 of FIG. 1.

It should be understood that changes and modifications in the form, construction, arrangement and combination of parts, and sequence of operations, may be made and substituted in place of these herein shown, without departing from the principle and scope of the inventions. In particular a substantial improvement in efficiency and power handling capability of the apparatus may be obtained by using superconducting materials in proper environment conditions for the construction of the induction.

What I claim is:

1. A voltage converter, including an input circuit having a first input terminal and a second input terminal and an output circuit having a first output terminal and a second output terminal; an inductive device and a first switch in a first circuit serially connected between said first input terminal and said first output terminal, circuit means connecting said second input terminal and said second output terminal to form a common terminal; current sensing means; voltage sensing means and a capacitor in parallel between said output terminals; said current sensing means and said voltage sensing means generating signals corresponding to the respective amplitudes of current and voltage sensed; a second switch in a second circuit with said common terminal and a portion of said first serially connected circuit, including said inductive device and said first input terminal, said second circuit comprising said current sensing means; a third switch in parallel with said portion of said first serially connected circuit comprising said inductive device; and switch control means being in circuit to receive signals from said current sensing means and said voltage sensing means and to actuate said first, second and third switches responsive to said signals to maintain the voltage at said output within predetermined limits when a load is connected between said output terminals and a voltage source is connected to said input terminals.

2. A voltage converter as defined in claim 1 wherein said first, second, and third switches each comprise solid state switching elements.

3. A voltage converter as defined in claim 1 wherein said switch control means effects operation of said first, second and third switches at selectively interlaced different time intervals.

4. A voltage converter as defined in claim 1, wherein said current sensing means is serially connected between said common terminal and said second switch.

5. A voltage converter, including an input circuit having a first input terminal and a second input terminal and an output circuit having a first output terminal and a second output terminal; and inductive device, current sensing means and uni-directional conductive device in circuit serially between said first input terminal and said first output terminal, circuit means connecting said second input terminal and said second output terminal to form a common terminal; said current sensing means and said voltage sensing means generating signals corresponding to the respective amplitudes of current and voltage sensed; a first switch in circuit including said current sensing means, said inductive device and said first input terminal; a second switch in parallel with said serially connected inductive device and said current sensing means; and switch control means, said switch control means being in circuit to receive signals from said current sensing means and said voltage sensing means and to actuate said first and second switches responsive to said signals to maintain the voltage at said output within predetermined limits when a load is connected between said output terminals and a voltage source is connected to said input terminals.

6. A voltage converter as defined in claim 5 wherein said first and second switches each comprise solid state switching elements.

7. A voltage converter as defined in claim 5 wherein said switch control means effects operation of said first and second switches at selectively interlaced different time intervals.

8. A voltage converter as defined in claim 5, wherein said current sensing means is serially connected between said common terminal and said first switch.

9. A voltage converter, including an input circuit having a first input terminal and a second input terminal and an output circuit having a first output terminal and a second output terminal; an inductive device and a first switch in a first circuit serially connected between said first input terminal and said first output terminal, circuit means connecting said second input terminal and said first input terminal to form a common terminal; current sensing means; voltage sensing means and a capacitor in parallel between said output terminals; said current sensing means and said voltage sensing means generating signals corresponding to the respective amplitudes of current and voltage sensed; a second switch in a second circuit with said common terminal and a portion of said first serially connected circuit including said inductive device and said first input terminal, said second circuit comprising said current sensing means; a unidirectional conductive device in parallel with said portion of said first serially connected circuit, comprising said inductive device; and switch control means, being in circuit to receive signals from said current sensing means and said voltage sensing means and to actuate said first and second switches responsive to said signals to maintain the voltage at said output within predetermined limits when a load is connected between said output terminals and a voltage source is connected to said input terminals.

10. A voltage converter as defined in claim 9 wherein said first and second switches each comprise solid state switching elements.

11. A voltage converter as defined in claim 9 wherein said switch control means effects operation of said first and second switches at selectively interlaced different time intervals.

12. A voltage converter, as defined in claim 9, wherein said current sensing means is serially connected between said common terminal and said second switch.

References Cited

UNITED STATES PATENTS

| | | | |
|---|---|---|---|
| 3,009,093 | 11/1961 | Seike | 323—22 |
| 3,215,925 | 11/1965 | Rieke | 323—66 X |
| 3,263,099 | 7/1966 | Bedford | 307—109 |
| 3,381,202 | 4/1968 | Loucks et al. | 321—2 |
| 3,427,477 | 2/1969 | Templin. | |

J D MILLER, Primary Examiner

G. GOLDBERG, Assistant Examiner

U.S. Cl. X.R.

307—98, 241, 246, 297; 323—9, 20, 22